United States Patent
Bhardwaj et al.

(10) Patent No.: US 10,424,779 B1
(45) Date of Patent: Sep. 24, 2019

(54) LITHIUM-ION CELLS AND METHODS OF MANUFACTURE

(71) Applicant: Google LLC, Mountain View, CA (US)

(72) Inventors: Ramesh C Bhardwaj, Fremont, CA (US); Tai Sup Hwang, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 218 days.

(21) Appl. No.: 15/259,037

(22) Filed: Sep. 7, 2016

(51) Int. Cl.
*H01M 4/134* (2010.01)
*H01M 10/0525* (2010.01)
(Continued)

(52) U.S. Cl.
CPC ........... *H01M 4/134* (2013.01); *H01M 2/022* (2013.01); *H01M 2/024* (2013.01); *H01M 2/145* (2013.01);
(Continued)

(58) Field of Classification Search
CPC ...... H01M 2/022; H01M 2/024; H01M 2/145; H01M 2/1646; H01M 2/1654; H01M 2/1673; H01M 4/0404; H01M 4/0435; H01M 4/131; H01M 4/134; H01M 4/136; H01M 4/382; H01M 4/386; H01M 4/483;
(Continued)

(56) References Cited

U.S. PATENT DOCUMENTS

2005/0130043 A1* 6/2005 Gao ..................... H01M 4/0435
429/231.95
2006/0286458 A1* 12/2006 Sato ...................... H01M 4/131
429/231.95
(Continued)

FOREIGN PATENT DOCUMENTS

EP 2613382 A2 * 7/2013 ............ H01M 4/362
EP 3046169 7/2016

OTHER PUBLICATIONS

Forney et al. "Prelithiation of Silicon-Carbon Nanotube Anodes for Lithium Ion Batteries by Stabilized Lithium Metal Powder (SLMP)"; Nano Lett. 2013, 13, pp. 4158-4163 (published Jul. 31, 2013). (Year: 2013).*

Li et al. "Effective enhancement of lithium-ion battery performance using SLMP"; Electrochemistry Communications 13 (2011), pp. 664-667 (available online Apr. 12, 2011). (Year: 2011).*

Wang et al. "High Volumetric Capacity Silicon-Based Lithium Battery Anodes by Nanosacle System Engineering" ; Nono Lett. 2013, 13, pp. 5578-5584 (published Oct. 28, 2013). (Year: 2013).*

(Continued)

*Primary Examiner* — Gregg Cantelmo
(74) *Attorney, Agent, or Firm* — McDonnell Boehnen Hulbert & Berghoff LLP

(57) ABSTRACT

The present disclosure relates to lithium-ion batteries and methods for their manufacture. Specifically, the method includes forming a cathode on a first substrate and forming an anode on a second substrate. The anode material includes silicon. The method includes slitting the first substrate and the second substrate. After slitting the respective substrates, the method includes depositing stabilized lithium metal particles on the anode and forming a cathode electrode tab coupled to the cathode and an anode electrode tab coupled to the anode. The method also includes coupling the anode and the cathode to form a layered structure. The method further includes winding the layered structure to form a rolled structure and placing the rolled structure in a container. The method additionally includes placing an electrolyte in the container sealing the container with the rolled structure and electrolyte placed therein to form a battery.

10 Claims, 8 Drawing Sheets

(51) Int. Cl.
*H01M 10/0587* (2010.01)
*H01M 4/136* (2010.01)
*H01M 4/48* (2010.01)
*H01M 4/58* (2010.01)
*H01M 4/38* (2006.01)
*H01M 4/505* (2010.01)
*H01M 4/525* (2010.01)
*H01M 4/131* (2010.01)
*H01M 2/16* (2006.01)
*H01M 4/04* (2006.01)
*H01M 2/14* (2006.01)
*H01M 10/04* (2006.01)
*H01M 2/02* (2006.01)
*H01M 10/44* (2006.01)
*H01M 10/52* (2006.01)

(52) U.S. Cl.
CPC ....... *H01M 2/1646* (2013.01); *H01M 2/1653* (2013.01); *H01M 2/1673* (2013.01); *H01M 4/0404* (2013.01); *H01M 4/0435* (2013.01); *H01M 4/131* (2013.01); *H01M 4/136* (2013.01); *H01M 4/382* (2013.01); *H01M 4/386* (2013.01); *H01M 4/483* (2013.01); *H01M 4/505* (2013.01); *H01M 4/525* (2013.01); *H01M 4/58* (2013.01); *H01M 10/0431* (2013.01); *H01M 10/0525* (2013.01); *H01M 10/0587* (2013.01); *H01M 10/446* (2013.01); *H01M 10/52* (2013.01); *H01M 2220/20* (2013.01); *H01M 2220/30* (2013.01)

(58) Field of Classification Search
CPC ........ H01M 4/505; H01M 4/525; H01M 4/58; H01M 10/0431; H01M 10/0525; H01M 10/446; H01M 10/52; H01M 2220/20; H01M 2220/30
See application file for complete search history.

(56) References Cited

U.S. PATENT DOCUMENTS

| | | |
|---|---|---|
| 2013/0271085 A1 | 10/2013 | Chen et al. |
| 2013/0295439 A1* | 11/2013 | Masarapu ................ H01B 1/24 429/163 |
| 2013/0337334 A1 | 12/2013 | Tao et al. |
| 2014/0065464 A1* | 3/2014 | Masarapu ............ H01M 4/134 429/149 |
| 2015/0050535 A1 | 2/2015 | Amiruddin et al. |
| 2016/0126543 A1 | 5/2016 | Ota et al. |
| 2016/0211507 A1* | 7/2016 | Sharma ............... H01M 4/0402 |

OTHER PUBLICATIONS

Zhong et al. "Synthesis and Electrochemistry of LiNixMn2—xO4"; J. Electrochem. Soc., vol. 144, No. 1 (Jan. 1997), pp. 205-213. (Year: 1997).*

* cited by examiner

LITHIUM-ION CELLS AND METHODS OF MANUFACTURE

BACKGROUND

Batteries that include lithium metal have a higher theoretical energy density as compared to other batteries that include alkaline or nickel-metal-hydride materials. Conventional lithium ion batteries have demonstrated gravimetric energy densities of approximately 250-260 Wh/kg.

However, lithium-containing batteries, particularly those having a silicon anode, have not realized their full potential due to various challenges such as poor cycle performance and safety concerns. A need exists to reduce the effects of volumetric expansion of the silicon anode and improve high temperature battery operation.

SUMMARY

Embodiments in the present disclosure relate to lithium-ion batteries and methods for their manufacture. Namely, various embodiments described herein describe batteries with silicon-containing anodes that may provide better cycle life, cell capacity, and/or higher temperature operations than conventional batteries.

In an aspect, a method of manufacturing of a battery is provided. The method includes forming a cathode on a first substrate. Forming the cathode on the first substrate includes coating a cathode current collector with a cathode material. The method also includes forming an anode on a second substrate. Forming the anode on the second substrate includes coating an anode current collector with an anode material. The anode material includes silicon. The method includes slitting the first substrate and the second substrate according to a battery form factor. The method yet further includes, after slitting the first substrate and the second substrate, depositing stabilized lithium metal particles on the anode. The method also includes, after slitting the first substrate and the second substrate, forming a cathode electrode tab coupled to the cathode and an anode electrode tab coupled to the anode. The method also includes coupling the anode and the cathode to form a layered structure. The layered structure includes a separator arranged between the anode and the cathode. The method further includes winding the layered structure to form a rolled structure and placing the rolled structure in a container. The method yet further includes placing an electrolyte in the container and sealing the container with the rolled structure and electrolyte placed therein to form a battery.

In an aspect, a battery is provided. The battery includes a container, an electrolyte disposed in the container, and a structure disposed in the container. The structure has a rolled shape with a spiral cross-section. The battery includes a cathode comprising a cathode material disposed on a first substrate of the structure. The cathode includes the cathode material coupled to a cathode current collector. The battery includes an anode comprising an anode material disposed on a second substrate of the structure. The anode includes the anode material coupled to an anode current collector. The battery also includes stabilized lithium metal particles disposed on the anode.

Other aspects, embodiments, and implementations will become apparent to those of ordinary skill in the art by reading the following detailed description, with reference where appropriate to the accompanying drawings.

DETAILED DESCRIPTION

Figure 1A:
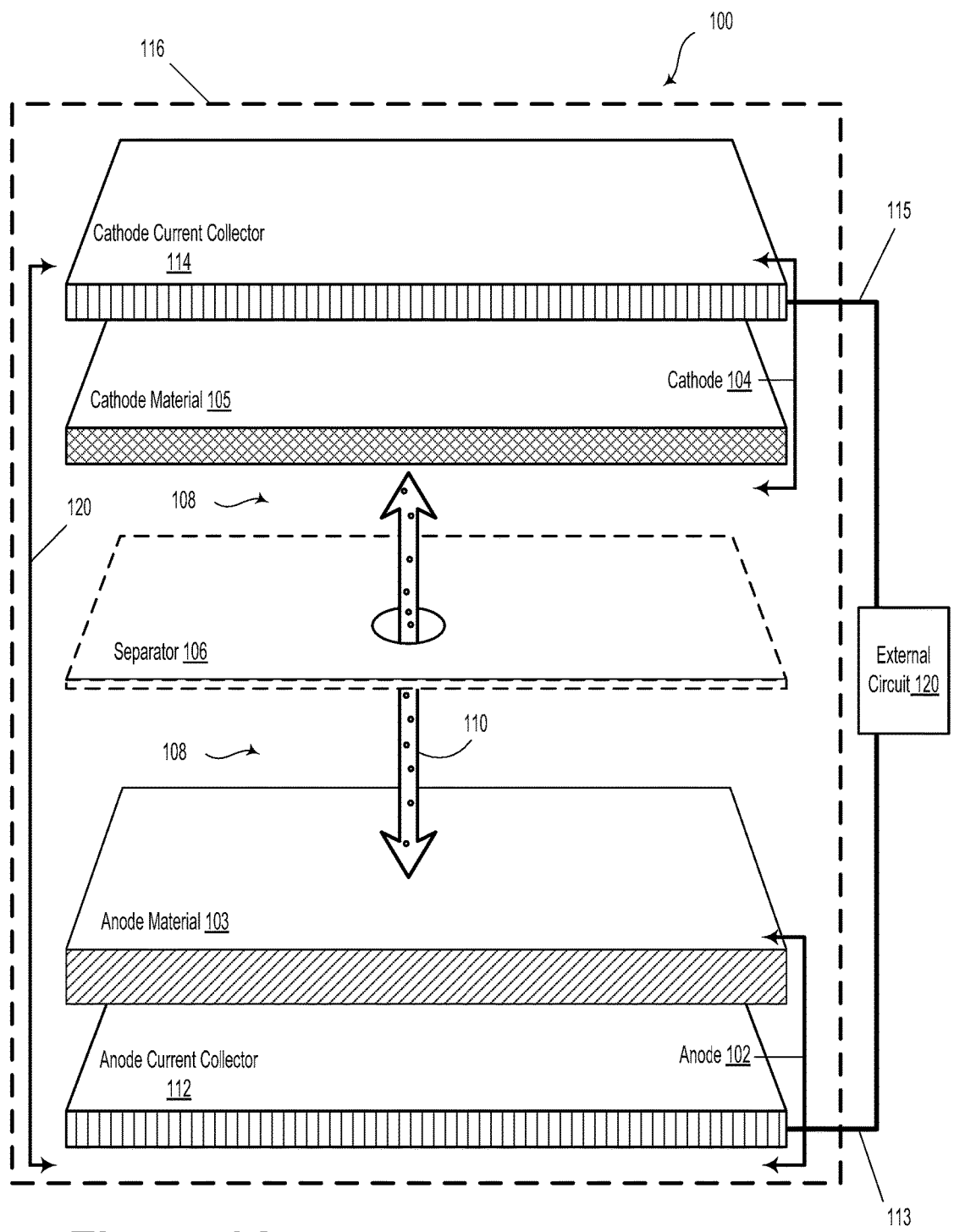
FIG. 1A illustrates a battery, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting.

Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

I. Overview

Lithium ion batteries are secondary (rechargeable) batteries that include a positive electrode (referred to as a cathode during discharge) that includes lithium. Conventional lithium ion batteries may include a carbon-containing negative electrode (referred to as an anode during discharge).

In such lithium ion batteries, anodes that include silicon may provide a much higher specific capacity than graphite anodes. For instance, in some embodiments, lithium ion batteries with silicon anodes may provide a 100× increase in specific capacity as compared to carbon-containing materials. However, based on a side reaction with conventional electrolytes, silicon anodes may expand or contract during the charge/discharge cycle. Such expansion and contraction may be a factor in relatively short cycle life for conventional silicon anode batteries (e.g., 300-400 cycles to 80% cell capacity), which is less than respective benchmarks of 500 cycles for consumer electronic devices and 1000 cycles for electric vehicles.

The present disclosure relates to lithium batteries with silicon-containing anodes and methods of their manufacture that may provide greater gravimetric energy densities than their conventional counterparts. Namely, various steps for manufacturing a battery may include deposition of stabilized lithium metal particles on a silicon/graphite composite anode and a cell formation process that includes a step charging process, a pulse charging process, or a combination thereof. For instance, the prelithiation of the anode with stabilized lithium particles may provide a longer cycle life by compensating for irreversible capacity loss during charge/discharge cycling.

In an example embodiment, the anode includes at least one of: silicon carbide, silicon monoxide, silicon dioxide, multi-wall carbon nanotubes, or a silicon carbon alloy. In some embodiments, the anode includes a silicon/graphite composite incorporating silicon at a weight percentage from 40% to 60%. In such scenarios, the silicon weight percentage may be predetermined based on a volumetric capacity model or volumetric capacity data. In some embodiments, a binder material may be selected so as to provide less electrode swelling as compared to other binders.

In an example embodiment, the cathode may include at least one of: Lithium Manganese Oxide ($LiMn_2O_4$), Nickel-rich Lithium Nickel Cobalt Manganese Oxide ($Li_wNi_xCo_yMn_zO_2$), Lithium-rich Lithium Nickel Cobalt Manganese Oxide ($Li_wNi_xCo_yMn_zO_2$), or Lithium Nickel Manganese Oxide ($LiNi_{0.5}Mn_{1.5}O_4$).

In an example embodiment, the battery may include a separator arranged between the cathode and the anode. The separator may include, for example, ceramic and/or a polymeric material. In some embodiments, the lithium battery may be packaged in a cylindrical shape, such as the 18650 cell form factor.

As such, the lithium batteries disclosed herein may provide higher gravimetric energy density than that of conventional lithium ion batteries. Furthermore, the batteries may provide longer cycle life and safer, more stable high temperature and high voltage (e.g., greater than 4.5 volts) operation.

II. Example Batteries

Figure 1B:
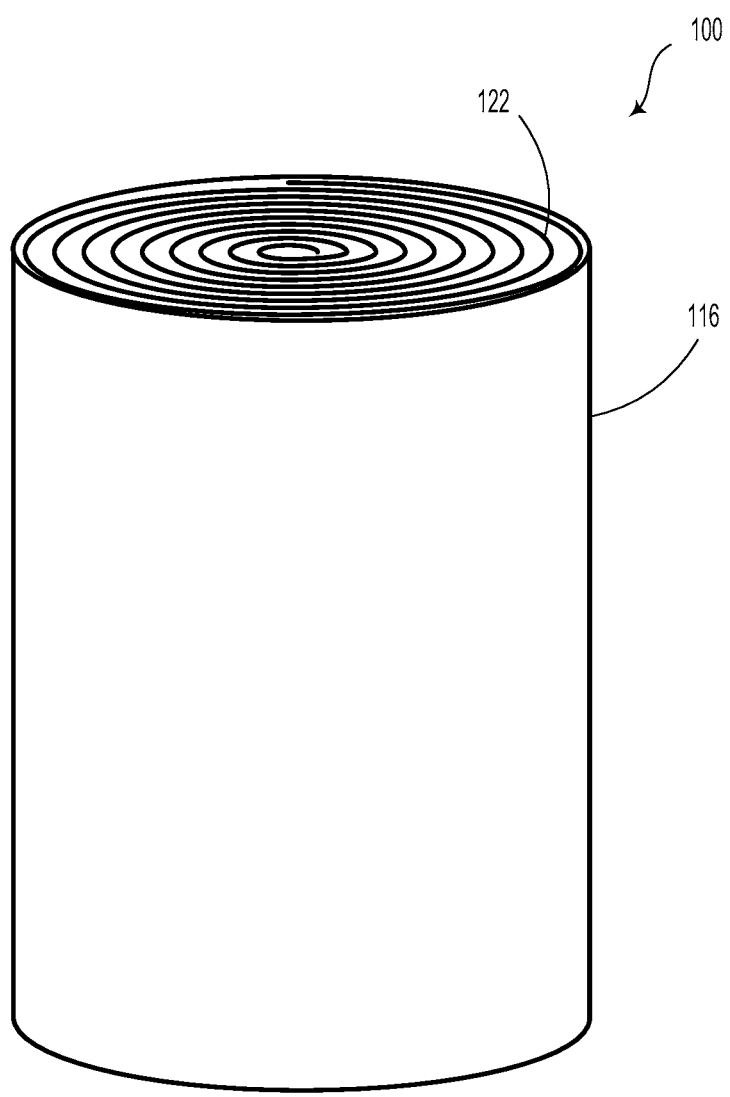
FIG. 1B illustrates a battery, according to an example embodiment.

FIGS. 1A and 1B illustrate various views of a battery 100, according to an example embodiment. FIG. 1A is a schematic illustration of the battery 100, which may include an anode 102, a cathode 104, and a separator 106.

In an example embodiment, the anode 102 may include one or more anode materials 103 coupled to a substrate, which may be an anode current collector 112. The anode material 103 may include one or more materials such as silicon, silicon monoxide (SiO), silicon dioxide ($SiO_2$), silicon carbide, or a silicon carbon alloy. In an example embodiment, the anode material 103 may include silicon at a weight percentage from 40% to 60%. In some embodiments, the silicon weight percentage may be predetermined based on a volumetric capacity model or volumetric capacity data.

The anode material 103 may additionally or alternatively include other carbonaceous materials such as hard carbon, soft carbon, graphite, or graphene. Some example embodiments may include nanoparticle forms of the anode materials described herein. The anode material 103 may include binder materials such as styrene butadiene copolymer (SBR) and/or polyvinylidene fluoride (PVDF). Other materials are contemplated for the anode material 103.

In an example embodiment, anode 102 may be "prelithiated" with stabilized lithium metal particles, which may be deposited on the anode 102 and may be sintered, pressed, or otherwise physically coupled to the anode 102. In some embodiments, the anode material 103 may be deposited in a slurry form onto the anode current collector 112 to form the anode 102. The anode material 103 may be deposited on other substrate materials, including polymeric or metallic materials. In an example embodiment, anode 102 may be formed via a roll-to-roll manufacturing process.

The cathode 104 may include one or more cathode materials 105 coupled to a substrate, which may be a cathode current collector 114. The cathode material 105 may include one or more materials such as a nickel-rich material. For example, cathode material 105 may include at least one of: Lithium Manganese Oxide ($LiMn_2O_4$), Nickel-rich Lithium Nickel Cobalt Manganese Oxide ($Li_wNi_xCo_yMn_zO_2$, where x>0.3), Lithium-rich Lithium Nickel Cobalt Manganese Oxide ($Li_wNi_xCo_yMn_zO_2$, where w>1), or Lithium Nickel Manganese Oxide ($LiNi_{0.5}Mn_{1.5}O_4$). In an example embodiment, the $Li_wNi_xCo_yMn_zO_2$ could have a composition with w=1, x=0.5-0.6, y=0.3-0.2, z=0.2-0.1. The nickel-rich $Li_wNi_xCo_yMn_zO_2$ may have a composition where w=1, x=0.55-0.75, y<0.3, and z=0.05-0.1. In an example embodiment, cathode material 105 may include Li-rich Lithium Nickel Cobalt Manganese Oxide with composition $Li_{1.2}Mn_{0.55}Ni_{0.15}Co_{0.1}O_2$ (e.g., w>1.1, x=0.1-0.2, y=0.05-0.15, z=0.5-0.6). It is understood that other compositions and other cathode materials are possible.

In some embodiments, the cathode 104 may be coated with aluminum oxide and/or another ceramic material, which may allow the battery to operate at higher voltages and/or higher temperatures. In some embodiments, the cathode material 105 may be deposited in a slurry form onto the cathode current collector 114. Cathode 104 may be formed by deposition of cathode material 105 on other substrate materials, including polymeric or metallic materials. In an example embodiment, cathode 104 may be formed via a roll-to-roll manufacturing process.

In an example embodiment, the anode 102 and the cathode 104 may be coupled so as to form a layered structure 120. For example, the layered structure may include a separator 106 disposed or otherwise arranged between the anode 102 and the cathode 104. The separator 106 may include a material configured to maintain a physical and electrical separation between the anode 102 and the cathode 104. The separator 106 may be a microporous membrane that is permeable to charge carriers (e.g. lithium ions) passing between the anode 102 and cathode 104. That is, the separator 106 may provide a physical barrier to prevent an electrical short while allowing reversible lithium ion transport between the anode 102 and the cathode 104.

In an example embodiment, the separator 106 may include a ceramic coating. Additionally or alternatively, the separator 106 may include one or more layers of a polymer-containing material (e.g. a polyolefin) such as polypropylene (PP), polyethylene (PE), or polymethylmethacrylate (PMMA), or a combination of such materials.

The electrolyte 108 of battery 100 may be arranged in and/or around the separator 106, and/or may be generally disposed between the anode 102 and the cathode 104. The electrolyte 108 may be configured to permit lithium ion conduction. Namely, electrolyte 108 may be configured to reversibly transport lithium ions via diffusion between the anode 102 and the cathode 104.

The electrolyte 108 may take the form of or include a liquid electrolyte in a salt/solvent solution. The salt/solvent solution may include a lithium salt such as at least one of: lithium-bis(oxalto) borate (LiBOB) or lithium difluoro(oxalato)borate (LiDFOB). In an example embodiment, the electrolyte 108 may include fluoroethylene carbonate (FEC) and may exhibit a viscosity of below 5 milliPascal-second (mPas). Other electrolyte compositions and viscosities are possible.

The lithium salt may be dissolved in an organic solvent such as silyl ether or siloxane. In an example embodiment, the solvent may include diethyl sulphite. Other electrolyte materials are possible, such as ethylene carbonate (EC), dimethyl carbonate (DMC), and/or diethyl carbonate (DEC).

In an example electrolyte 108, the lithium salt may be incorporated or dissolved in the solvent with various molar concentrations. For example, the salt may be dissolved in the solvent with a molar concentration (e.g., molar ratio) between 0.8 to 1.9 (mol/L). In another example embodiment, the electrolyte 108 may include a solvent having a high-concentration of silyl ether. Further, in some embodiments, the solvent may include EC and DEC in about a 1:2 volume ratio, however other volume ratios are possible. For example, the volume ratio of EC to DEC may vary within a range 1:1.8 to 1:2.2. Other lithium salts and/or solvents are possible.

The electrolyte 108 may also include one or more additives. For example, the electrolyte 108 may include at least one of: fluorinated cyclic carbonate, fluorinated linear carbonate, or fluorinated ether. In such a scenario, the additive may be incorporated into the electrolyte with a mass to volume ratio between 1:100 and 1:20.

Other additives are possible. For example, additives incorporated into electrolyte 108 may include propylene carbonate (PC), propylsultone (PS), fluorobenzene (FB), lithium difluoro(oxalato)borate (LiFOB), and/or succinonitrile (SN). In some embodiments, PC may be added to electrolyte 108 with a 6-9% weight ratio. In such a scenario, PS may be incorporated into electrolyte 108 with a 3-4% weight ratio. Furthermore, FB may be incorporated into electrolyte 108 with a 3-5% weight ratio. SN may be incorporated into electrolyte 108 within a 1-3% weight ratio.

As described in embodiments herein, "weight ratio" is meant to describe a respective solute as a percent (by mass) of the total solution. For example, 5 grams of solute dissolved in 20 grams of solution would be equivalent to a 20% weight ratio.

Furthermore, as described herein, "volume ratio" is meant to describe a volume of a first component in proportion to a volume of a second component.

In example embodiments, cathode materials described herein may be deposited using various techniques such as RF sputtering or physical vapor deposition (PVD). However other deposition techniques may be used to form the cathode 104. The deposition of the cathode 104 may occur as a blanket over an entire substrate material. A subtractive process of masking and etching may remove cathode material where unwanted. Additionally or alternatively, the deposition of the cathode 104 may be masked using a photolithography-defined resist mask.

The battery 100 may additionally include an anode current collector 112 and/or a cathode current collector 114. In an example embodiment, the anode current collector 112 and the cathode current collector 114 may include one or more materials that function as electrical conductors. Furthermore, the anode current collector 112 and the cathode current collector 114 may be configured to be block lithium ions and various reaction products ($H_2O$, $O_2$, $N_2$, etc.). In some embodiments, the anode current collector 112 and the cathode current collector 114 may include materials that have minimal reactivity with lithium. For example, the anode current collector 112 and/or the cathode current collector 114 may include one or more of: Au, Ag, Al, Cu, Co, Ni, Pd, Zn, and Pt. Alloys of such materials are also contemplated herein. In some embodiments, an adhesion layer material, such as Ti, may be included in the anode current collector 112 and/or the cathode current collector 114. In other words, the anode current collector 112 and/or the cathode current collector 114 may include multiple layers, e.g. TiPtAu. Other materials are possible to form the respective current collectors. For example, the anode current collector 112 and/or the cathode current collector 114 may be formed from carbon nanotubes and/or metal nanowires.

The anode current collector 112 and/or the cathode current collector 114 may be deposited using RF or DC sputtering of source targets. Alternatively, PVD, electron beam-induced deposition or focused ion beam deposition may be utilized to form the respective current collectors.

In embodiments, the cathode current collector 114 may include a cathode electrode tab 115 coupled to the cathode 104. Furthermore, the anode current collector 112 may include an anode electrode tab 113 coupled to the anode 102.

In an example embodiment, the anode current collector 112 and the cathode current collector 114 may be operable to be electrically coupled (e.g., through container 116) to an external circuit 120. That is, the battery 100 may generally provide power to the external circuit 120. In some cases, such as while charging battery 100, external circuit 120 may provide power to battery 100 so as to recharge it.

The external circuit 120 may include an electronic device, such as a computer, a laptop, a smartphone, a wearable device, a smartwatch, a tablet, an electric car, an electrical grid, or a mobile computing device. Generally, the external circuit 120 may include one or more devices that consume electrical power provided by the battery 100. Additionally, as described above, the external circuit 120 may include a charging device configured to recharge battery 100.

The anode 102, the cathode 104, the separator 106 the anode current collector 112 and the cathode current collector 114, may be disposed in a layered structure 120. In other words, the anode 102, the cathode 104, the separator 106, etc., may be layered or stacked on one another. Additionally or alternatively, the layered structure 120 may include one or more materials suitable for roll-to-roll fabrication methods, such as metal foil or flexible plastic. Accordingly, the layered structure 120 may include a metal, such as copper (Cu), nickel (Ni), or an alloy thereof. Additionally or alternatively, the layered structure 120 may include polyethylene, polypropylene, or another polymer material. Other materials are contemplated.

As illustrated in FIG. 1B, the layered structure 120 may be wound so as to form a rolled structure 122, which may be termed a "jelly-roll". As an example, the layered arrangement 120 may be wound into a substantially cylindrical shape as may be formed via a roll-to-roll manufacturing method, such as the method illustrated and described in reference to method 200 and FIGS. 3A-3G In some embodiments, the layered arrangement 120 may be wound around a shaped form. Shaped forms may include a rectangular card, a cylinder, or another forms configured to provide a shape and/or structural support for the rolled structure 122. Shaped forms may include an insulating polymeric material such as polyethylene.

As illustrated in FIG. 1B, the rolled structure 122 may be inserted or otherwise packaged within container 116. The container 116 may include a plastic, glass, ceramic, or metal enclosure. In some embodiments, the container 116 may include a standard form factor (e.g., a standard battery cell size). For example, the container 116 may be cylindricallyshaped according to the 18650 cell standard (e.g., 18.6 mm diameter×65.2 mm length). Other common cell form factors are possible. For example, the container 116 may be formed according to 32650 (32 mm diameter×67.7 mm length), 21-70 (21 mm diameter×71 mm length), AAA, AA, CR2, 9V, C, D, or another cell size format. In some embodiments, the container 116 may include a prismatic battery cell format.

In an example embodiment, container 116 may include a pouch formed from aluminized polymer. The container 116 may include electrical feedthroughs to provide electrical connections to the anode current collector 112 and the cathode current collector 114. In some embodiments, the container 116 may include extra volume and material so as to accommodate gases that may be outgassed from the battery 100 during a cell formation process. In an example embodiment, the container 116 may be pressure- and/or heat-sealed on one or more surfaces so as to enclose, package, and protect the battery 100.

As a result of outgassing during an initial cell formation process, one or more dimensions of the container 116 may expand. However, embodiments herein may be operable to limit container thickness expansion to less than or equal to 8% over a two week storage period subsequent to the initial cell formation cycle.

As a further result of the initial cell formation process and subsequent charge/discharge cycles, a solid electrolyte interphase (SEI) layer may form on one or both of the anode 102 and the cathode 104. The SEI layer may include at least one of: lithium fluoride (LiF), lithium carbonate ($Li_2CO_3$), or lithium oxide ($Li_2O$). In such a scenario, the SEI layer may be electrically insulating while still configured to permit the transport of lithium ions through the SEI layer via diffusion.

In an example embodiment, the electrolyte may be configured to maintain and/or repair the solid electrolyte interface (SEI) that forms on the anode 102 and/or the cathode 104.

In an example embodiment, the battery 100 may be configured to operate with a cell voltage of at least 4.5 volts. However, other operating voltages are possible. Furthermore, the battery 100 may have a gravimetric energy density greater than 280 watt hours per kilogram.

Example embodiments described herein may provide a battery operable to retain an 80% capacity over at least 400 charge/discharge cycles. That is, a battery may have an initial charge capacity upon initial normal use. Such a battery may provide at least 400 charge/discharge cycles before its "fully charged" charge capacity falls below 80% of the initial charge capacity.

In other embodiments, the battery described herein may be operable to retain 70% capacity over at least 500 charge/discharge cycles.

In an example embodiment, the battery may be configured to operate with a cell voltage of at least 3.5 volts. Furthermore, when packaged in the 18650 cell package, embodiments may provide at least 4.0 Ah with a cell weight of 48 g. That is, embodiments herein may include an energy density of over 300 Wh/kg. Furthermore, the battery may be configured to operate at an operating temperature of at least 50 degrees Celsius.

It should be understood that FIGS. 1A and 1B illustrate the battery 100 in a "single cell" configuration and that other configurations are possible. For example, the battery 100 may be connected in a parallel and/or series configuration with similar or different batteries or circuits. In other words, several instances of battery 100 may be connected in series to in an effort to increase the open circuit voltage of the battery, for instance. Similarly, several instances of battery 100 may be connected in parallel to increase capacity (amp hours). In other embodiments, battery 100 may be connected in configurations involving other batteries. In an example embodiment, a plurality of instances of battery 100 may be configured in a planar array on a given substrate. Battery 100 may also be arranged in a thin film-type configuration. Other arrangements and configurations are possible.

III. Example Methods of Manufacture

Figure 2:
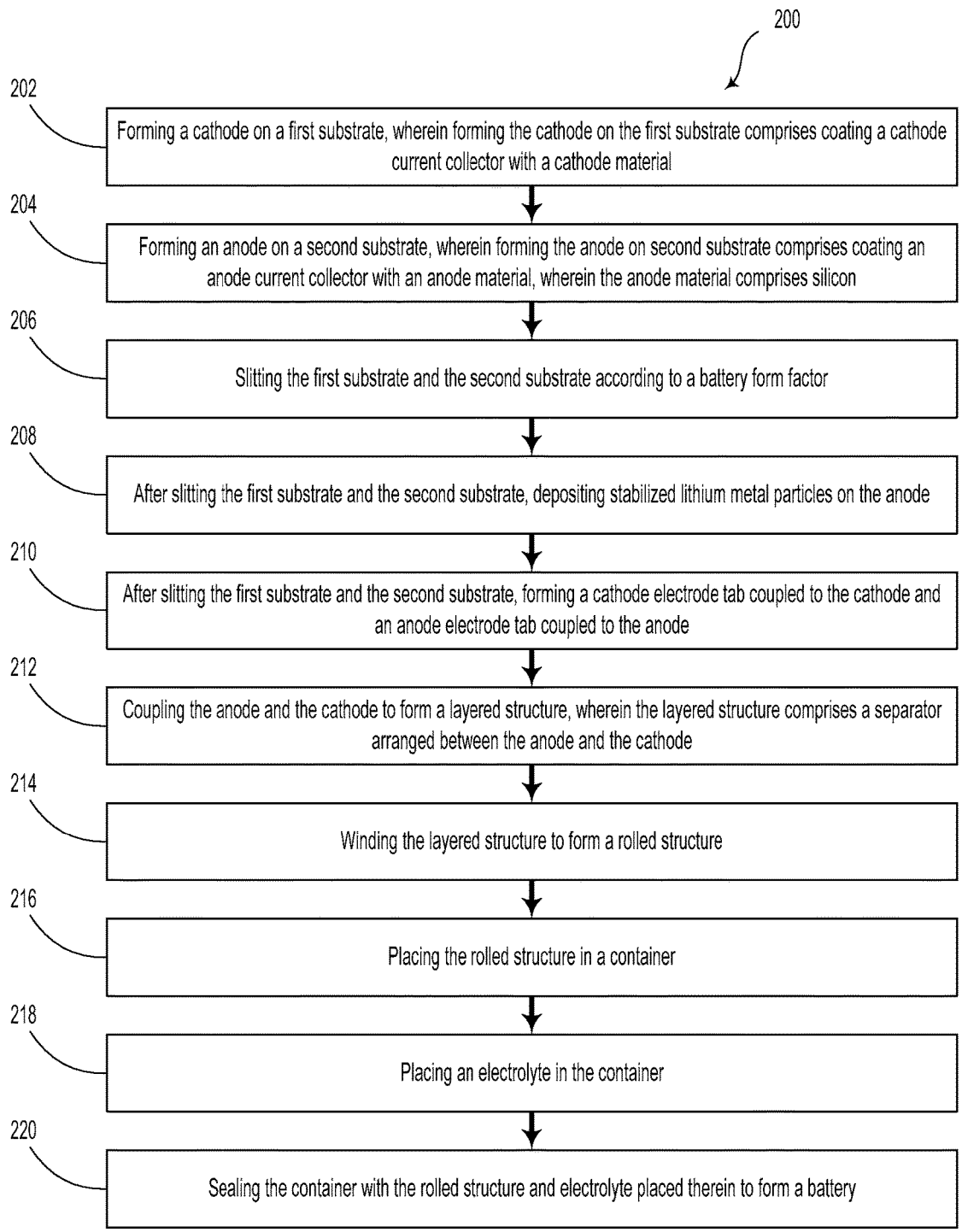
FIG. 2 illustrates a method, according to an example embodiment.

FIG. 2 illustrates a method of manufacturing 200, according to an example embodiment. The method 200 may include various blocks or steps. The blocks or steps may be carried out individually or in combination. The blocks or steps may be carried out in any order and/or in series or in parallel. Further, blocks or steps may be omitted or added to method 200.

The blocks of method 200 may be carried out to form or compose the elements of battery 100 as illustrated and described in reference to FIGS. 1A and 1B. Additionally or alternatively, method 200 may include some or all of the steps or blocks of the method of manufacture 300 illustrated and described in reference to FIGS. 3A-3G Block 202 includes forming a cathode on a first substrate. The cathode may be similar or identical to the cathode 104 as illustrated and described in reference to FIGS. 1A and 1B. In an example embodiment, forming the cathode on the first substrate may include coating a cathode current collector with a cathode material. The cathode material may include at least one of: Lithium Manganese Oxide ($LiMn_2O_4$), Nickel-rich Lithium Nickel Cobalt Manganese Oxide ($Li_wNi_xCo_yMn_zO_2$), Lithium-rich Lithium Nickel Cobalt Manganese Oxide ($Li_wNi_xCo_yMn_zO_2$), or Lithium Nickel Manganese Oxide ($LiNi_{0.5}Mn_{1.5}O_4$). Other cathode materials are contemplated within the scope of the present disclosure.

Block 204 includes forming an anode on a second substrate. The anode could be similar or identical to anode 102 as illustrated and described in reference to FIGS. 1A and 1B. In an example embodiment, forming the anode on the second substrate includes coating an anode current collector with an anode material. The anode material includes silicon. In some embodiments, the anode may include silicon at a weight percentage from 40% to 60%, although other weight percentages are possible. In an example embodiment, the silicon weight percentage may be predetermined based on a volumetric capacity model or volumetric capacity data.

Additionally or alternatively, the anode may include at least one of: silicon carbide, silicon monoxide, silicon dioxide, multi-wall carbon nanotubes, or a silicon carbon alloy. Other anode materials are possible and contemplated within the scope of the present disclosure.

Optionally, the method 200 may include forming a separator between the anode and the cathode. The provided separator may be similar or identical to separator 106 as illustrated and described in reference to FIGS. 1A and 1B. The separator includes an electrically-insulating material. In such a scenario, the separator may include a polymeric material and/or a ceramic material. In an example embodiment, the anode, cathode, and separator are disposed in a layered arrangement. In an example embodiment, the separator may be incorporated into the layered arrangement via a roll-to-roll processing system.

Block 206 includes slitting the first substrate and the second substrate according to a battery form factor. In such a scenario, the method 200 may include trimming, cutting, slicing, or otherwise adjusting the cathode and the anode to an appropriate width and/or length so as to fit a desired battery form factor or package size. For example, the first substrate and the second substrate may be cut into strip-like portions, the width of which may be based on a desired battery size. Optionally, the first substrate and/or the second substrate may be calendared (e.g., pressed between a plurality of rollers) so as to provide a standard thickness for the respective substrates.

Block 208 includes after slitting the first substrate and the second substrate, depositing lithium metal on the anode. That is, method 200 may include incorporating lithium metal into, and/or onto, the anode. In an example embodiment, a lithium metal may be introduced onto/into the anode in a pre-lithiation process. The pre-lithiation process may be provided in various ways. For example, lithium metal may be electroplated onto the anode via an electrochemical process. Namely, the anode may be immersed in a lithium-containing solution. In such a scenario, an electrical field may be created between the solution and the anode. Lithium metal may dissociate from the solution and become incorporated into the anode.

Alternatively or additionally, lithium metal may be evaporated onto the anode. For example, a lithium metal target may be a source for a RF sputtering, electron beam, thermal, or plasma-based evaporation system.

As another alternative, lithium metal may be deposited onto the anode via a stabilized lithium metal powder (SLMP). In an example embodiment, the SLMP may be sprayed or otherwise deposited onto the anode. Further processing steps, such as physical pressure and/or heating/sintering may be provided. Other ways of incorporating lithium metal into and/or onto a surface of the anode are contemplated herein.

In some embodiments, a pretreatment step may be provided before the incorporation of lithium into the anode. For example, the anode may be cleaned with an organic solvent and/or a wet chemical (e.g. HF) etch. Other surface preparation or cleaning processes are contemplated herein.

Block 210 includes after slitting the first substrate and the second substrate, forming a cathode electrode tab coupled to the cathode and an anode electrode tab coupled to the anode. The cathode electrode tab and the anode electrode tab may provide electrical connections to the cathode and anode, respectively, when the battery is packaged in a container.

Block 212 includes coupling the anode and the cathode to form a layered structure. The layered structure may include a separator arranged between the anode and cathode.

Block 214 includes winding the layered structure to form a rolled structure. The rolled structure may include wrapping or winding the layered structure into a substantially cylindrical shape so as to resemble a "jelly-roll" configuration. As an example, the rolled structure may be formed by winding the layered structure several times around a spindle and/or a shaped form using a roll-to-roll processing system. In an example embodiment, the rolled structure may include a spiral cross-section.

The method 200 may optionally include compressing the rolled structure. The compression could be performed by a pneumatic clamp. In such a scenario, the pneumatic clamp may be configured to compress the rolled structure via one or more compressed gas cylinders or pistons. For example, the rolled structure may be compressed with a predetermined pressure at a predetermined temperature for a predetermined time. In such a scenario, the rolled structure may undergo a 130 kilogram force (kgf) at 70° C. for 3 minutes. In some embodiments, such a pressure or force may compress the rolled structure into a substantially flat, rectangular shape. Other shapes (e.g., a cylinder) are possible.

Block 216 includes placing the rolled structure in a container. In an example embodiment, the container may be a cylindrical battery casing. In an example embodiment, a robotic pick and place device may be configured to place the rolled structure into the open pouch or open-ended cylindrical battery casing.

Block 218 includes placing an electrolyte in the container. The electrolyte may be similar or identical to electrolyte 108 as illustrated and described in reference to FIGS. 1A and 1B. In an example embodiment, the electrolyte may include a salt dissolved in a solvent and an additive. In such an embodiment, the salt includes at least one of: lithium-bis (oxalto) borate (LiBOB) or lithium difluoro(oxalato)borate (LiDFOB). Furthermore, the solvent includes at least one of: silyl ether or siloxane. In an example embodiment, the additive includes at least one of: fluorinated cyclic carbonate, fluorinated linear carbonate, or fluorinated ether. In an example embodiment, the solvent may additionally or alternatively include diethyl sulphite.

In some embodiments, the electrolyte may include the salt being dissolved in the solvent with a molar ratio between 0.8 to 1.9. Furthermore, the additive may be incorporated into the electrolyte with a mass to volume ratio between 1:100 and 1:20.

In an example embodiment, the electrolyte is configured to maintain and/or repair a solid electrolyte interface (SEI) that forms on the anode and/or the cathode. For example, the solid electrolyte interface may include lithium fluoride (LiF). In such a scenario, the electrolyte may chemically replace LiF lost due to, for example, battery charge/discharge cycling.

In some embodiments, the method 200 may include soaking the rolled structure in the electrolyte for a predetermined soak time and a predetermined soak temperature. That is, electrolyte may be introduced into the open container (e.g., cylindrical battery casing). In an example embodiment, the rolled structure may be soaked in the electrolyte for 2 hours at 40° C. While soaking, a temperature of the electrolyte and/or the rolled structure may increase to approximately 50° C. Furthermore, while soaking, the dimensions of the packaged battery may increase.

Optionally, the packaged battery may be clamped or otherwise constrained so as to maintain one or more package dimensions. Under such conditions, the rolled structure may be further soaked in the electrolyte for 46 hours at 40° C. Other battery manufacturing steps (e.g., soak times and soak temperatures) are possible.

Block 220 includes sealing the container with the rolled structure and electrolyte placed therein to form a battery. As described herein, the battery formed by method 200 may be similar or identical to battery 100, illustrated and described with regard to FIGS. 1A and 1B.

In an example embodiment, the battery formed by method 200 may be configured to operate with a cell voltage of at least 3.5 volts, and in some embodiments greater than 4.5 volts. Furthermore, the battery may provide a gravimetric energy density greater than 280 watt hours per kilogram.

Optionally, the method 200 may include charging the battery using a cell formation process. In an example embodiment, the cell formation process may include at least one of: a step charging process, a pulse charging process, or a combination thereof. Additionally or alternatively, method 200 may include degassing the battery during or after the cell formation process.

As an example, an initial cell formation cycle may be carried out after the electrolyte soaking step(s). The initial cell formation cycle may include various charge, discharge, rest, and degas steps. Subsequent to the initial cell formation cycle, various dimensions of the packaged battery may be measured periodically over a span of time. Namely, over a two week storage period, a characteristic dimension of the battery package may be measured. Embodiments herein may be operable to swell less than other battery designs. As such, swelling of the characteristic dimension of the battery package may be less than or equal to 8% over the two week storage period.

Due to the initial cell formation cycle and/or charge/discharge cycles, the battery may develop a solid electrolyte interphase (SEI) layer on the anode and/or the cathode. In such a scenario, the SEI layer may include lithium fluoride (LiF), lithium carbonate ($Li_2CO_3$), or lithium oxide ($Li_2O$).

FIGS. 3A-3G illustrate battery manufacturing scenario 300, according to an example embodiment. Battery manufacturing scenario 300 may include several steps or blocks that may be carried out in the order as illustrated. Alternatively, the steps or blocks may be carried out in a different order. Furthermore, steps or blocks may be added or subtracted within the scope of the present disclosure. Battery manufacturing scenario 300 may be similar or identical to method 200 as illustrated and described with regard to FIG. 2.

Figure 3A:
FIG. 3A illustrates a battery manufacturing scenario, according to an example embodiment.
Figure 3A:
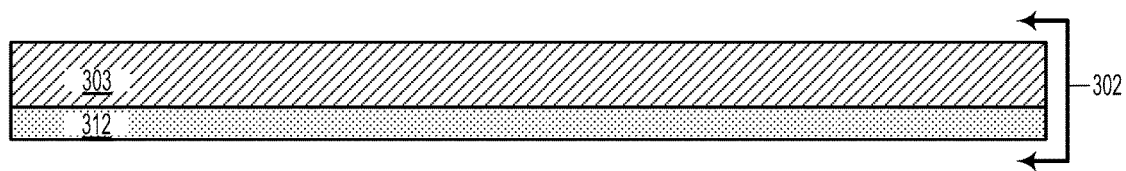

FIG. 3A includes forming an anode 302. The anode 302 may be similar or identical to anode 102 as described in reference to FIGS. 1A and 1B. For example, the anode 302 may include an anode material 303 deposited on a first substrate 312, such as an anode current collector. The anode material 303 may include silicon, silicon monoxide (SiO), or another silicon-containing compound. In some embodiments, the anode 302 may be formed by using a coating machine to deposit anode material 303 in the form of a slurry or paste onto the first substrate, which may be aluminum or copper foil.

Figure 3B:
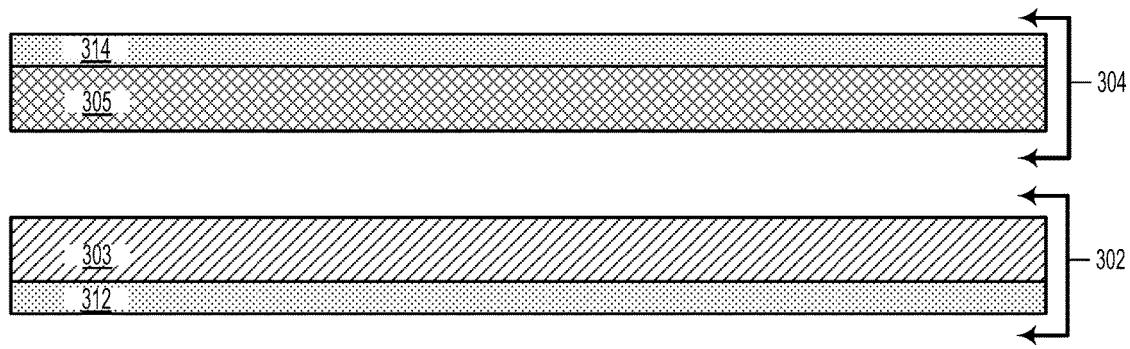
FIG. 3B illustrates a battery manufacturing scenario, according to an example embodiment.

FIG. 3B includes forming a cathode 304. The cathode 304 may be similar or identical to cathode 104 as illustrated and described in FIGS. 1A and 1B. The cathode 304 may include a cathode material 305 deposited on a second substrate 314, such as a cathode current collector. The cathode material 305 may include at least one of: Lithium Manganese Oxide ($LiMn_2O_4$), Nickel-rich Lithium Nickel Cobalt Manganese Oxide ($Li_wNi_xCo_yMn_zO_2$), Lithium-rich Lithium Nickel Cobalt Manganese Oxide ($Li_wNi_xCo_yMn_zO_2$), or Lithium Nickel Manganese Oxide ($LiNi_{0.5}Mn_{1.5}O_4$). In an example embodiment, cathode 304 may be formed by depositing cathode material 305 in slurry form onto the second substrate 314 using a coating machine.

In an example embodiment, the cathode 304 and the anode 302, and their corresponding substrates, may be trimmed, or slit, according to a battery form factor. That is, the first substrate and the second substrate may be formed into one or more strips, the width of which may correspond to, or may be based on, a battery container dimension.

In some embodiments, conductive electrode tabs may be coupled to the cathode 304 and the anode 302 so as to provide an electrical contact to the respective elements when packaged.

Figure 3C:
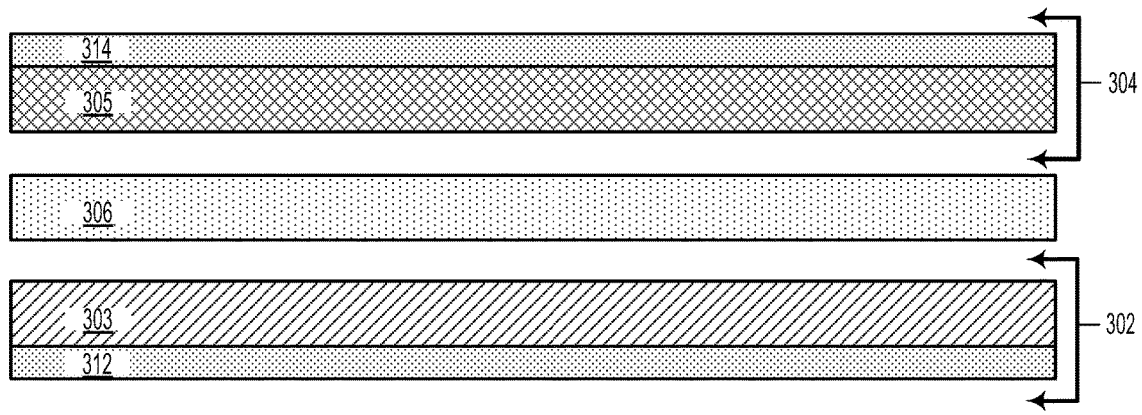
FIG. 3C illustrates a battery manufacturing scenario, according to an example embodiment.

FIG. 3C includes arranging a separator 306 between the anode 302 and the cathode 304. The separator 306 may be similar or identical to separator 106 as illustrated and described in reference to FIGS. 1A and 1B. In such a scenario, the separator 306 may include an electrically-insulating material, such as a ceramic coating. The ceramic coating may provide improved battery safety and/or reduce the risk of a short circuit and other battery hazards.

As shown in FIG. 3C, the anode 102, the cathode 104, and the separator 306 are disposed in a layered arrangement. In some embodiments, the anode 102, the cathode 104, and the separator 306 may be coupled to form a layered structure via a calendaring process (e.g., pressing between two rollers).

Figure 3D:
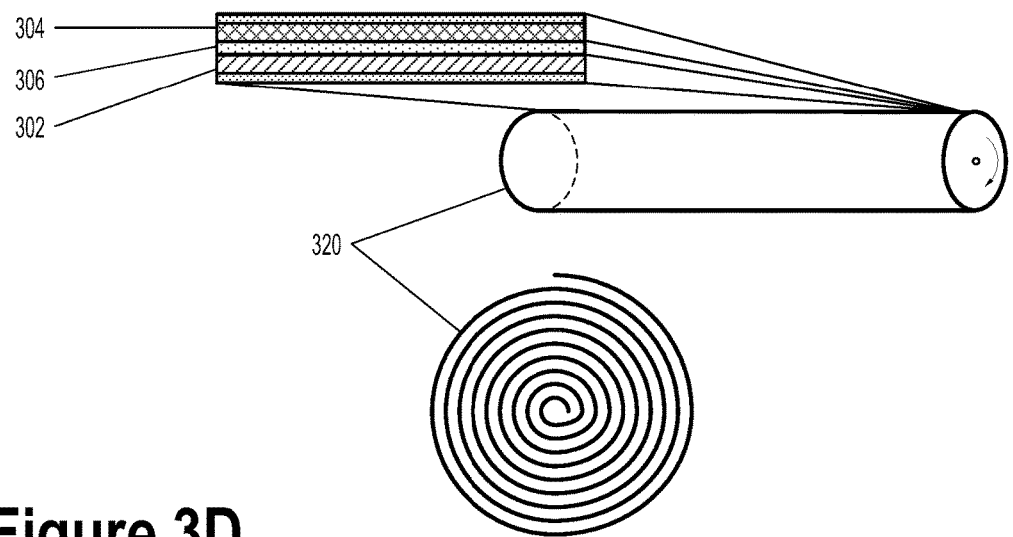
FIG. 3D illustrates a battery manufacturing scenario, according to an example embodiment.

FIG. 3D includes winding the layered structure so as to form a rolled structure 320. For example, the layered structure may be wound around a spindle or a hub so as to form a substantially cylindrical "spiral" configuration. Such a configuration may be termed a "jelly roll" configuration. FIG. 3D illustrates oblique and cross-sectional views of the rolled structure 320.

Figure 3E:
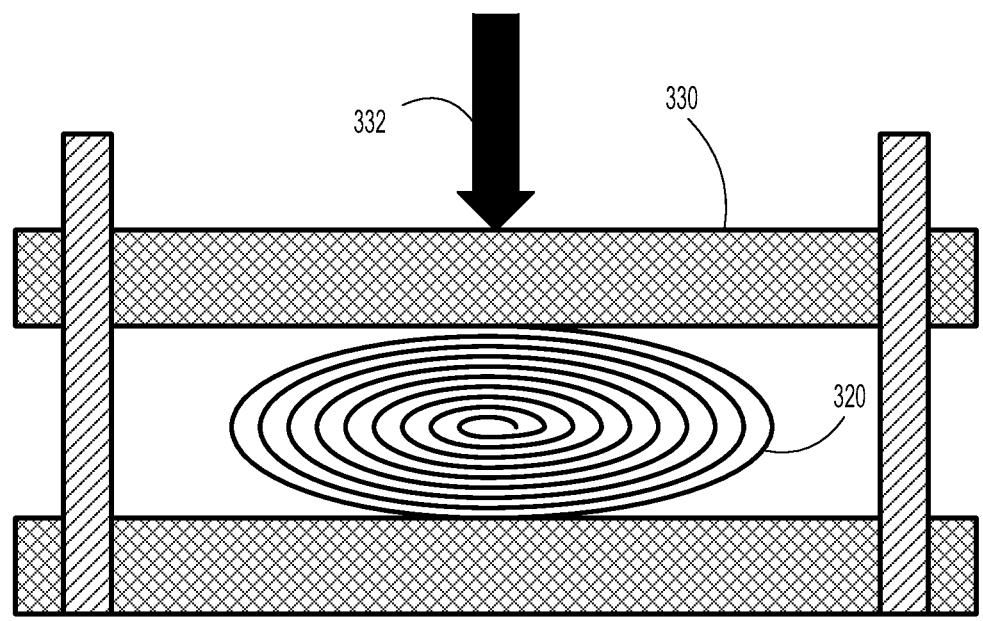
FIG. 3E illustrates a battery manufacturing scenario, according to an example embodiment.

FIG. 3E includes compressing the rolled structure 320 with a clamp 330. Compressing the rolled structure 320 may include providing a force 332. In an example embodiment, the force 332 on the rolled structure 320 may be equal to 120 kgf. Optionally, additional heat may be provided (70° C.) for a specified time (3 minutes). As an example, clamp 330 may include two rigid plates and several alignment pins. As such, clamp 330 may be configured to apply a force 332 to the rolled structure 320. The clamp 330 may include a pneumatic cylinder, gas piston, or another way to provide a physical force between the two rigid plates via gas pressure.

Figure 3F:
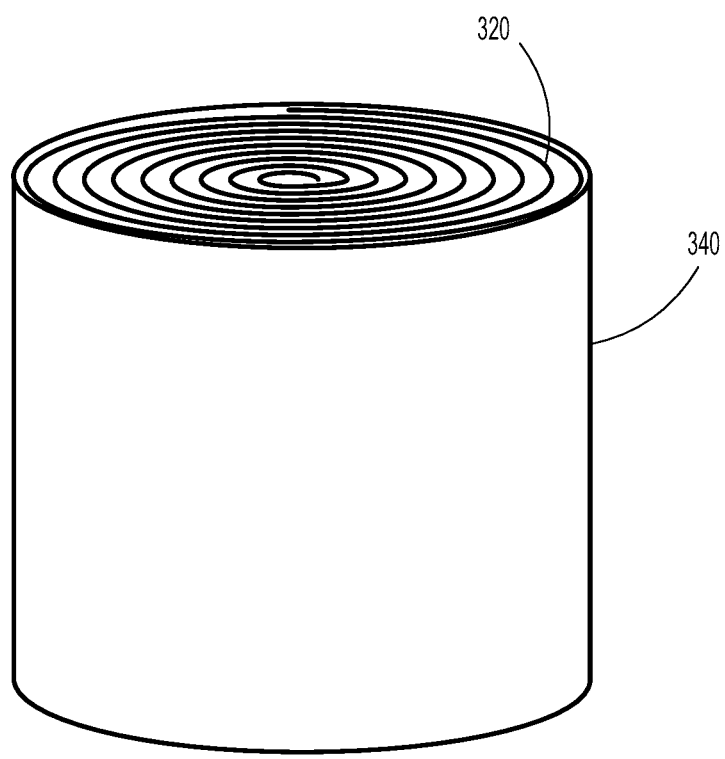
FIG. 3F illustrates a battery manufacturing scenario, according to an example embodiment.

FIG. 3F includes packing the rolled structure 320 in a container 340 to form a packaged battery. The container 340 may optionally include gas expansion volume (not illustrated) so as to provide for a way to remove outgassed products during initial cell formation. The container 340 may be sealed along at least one surface. At least initially, the container 340 may be configured to remain open so as to receive an electrolyte 350.

While FIGS. 3E and 3F illustrate method steps that relate to manufacturing of a battery cell, it is understood that the rolled structure 320 may additionally or alternatively be inserted into a pouch cell or another type of battery cell. Other battery form factors are possible within the scope of the present disclosure.

Figure 3G:
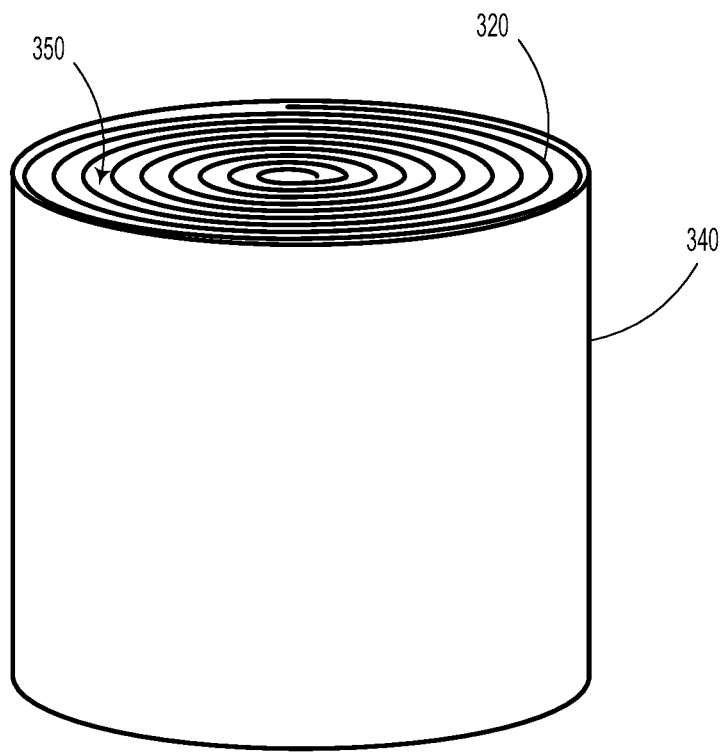
FIG. 3G illustrates a battery manufacturing scenario, according to an example embodiment.

FIG. 3G includes soaking the rolled structure 320 in the electrolyte 350 for a predetermined soak time at a predetermined soak temperature. As described elsewhere herein, the electrolyte 350 may include a salt dissolved in a solvent and an additive. In such an embodiment, the salt includes at least one of: lithium-bis(oxalto) borate (LiBOB) or lithium difluoro(oxalato)borate (LiDFOB). Furthermore, the solvent includes at least one of: silyl ether or siloxane. In an example embodiment, the additive includes at least one of: fluorinated cyclic carbonate, fluorinated linear carbonate, or fluorinated ether. In an example embodiment, the solvent may additionally or alternatively include diethyl sulphite. In an example embodiment, the predetermined soak time is 2 hours and the predetermined soak temperature is 40° C., although other soak times and soak temperatures are possible.

Optionally, the method 300 may include soaking the rolled structure 320 in the electrolyte 350 for 46 hours at 40° C. Furthermore, in some embodiments, subsequent to an initial cell formation cycle, a thickness of the pouch 352 does not increase more than 8% over a two week storage period.

In some embodiments, a solid electrolyte interphase (SEI) layer may be present on at least one element of the rolled structure 320. The SEI layer includes at least one of: lithium fluoride (LiF), lithium carbonate ($Li_2CO_3$), or lithium oxide ($Li_2O$).

In an example embodiment, the container 340 may be sealed by a conductive or insulating cap.

Figure 4:
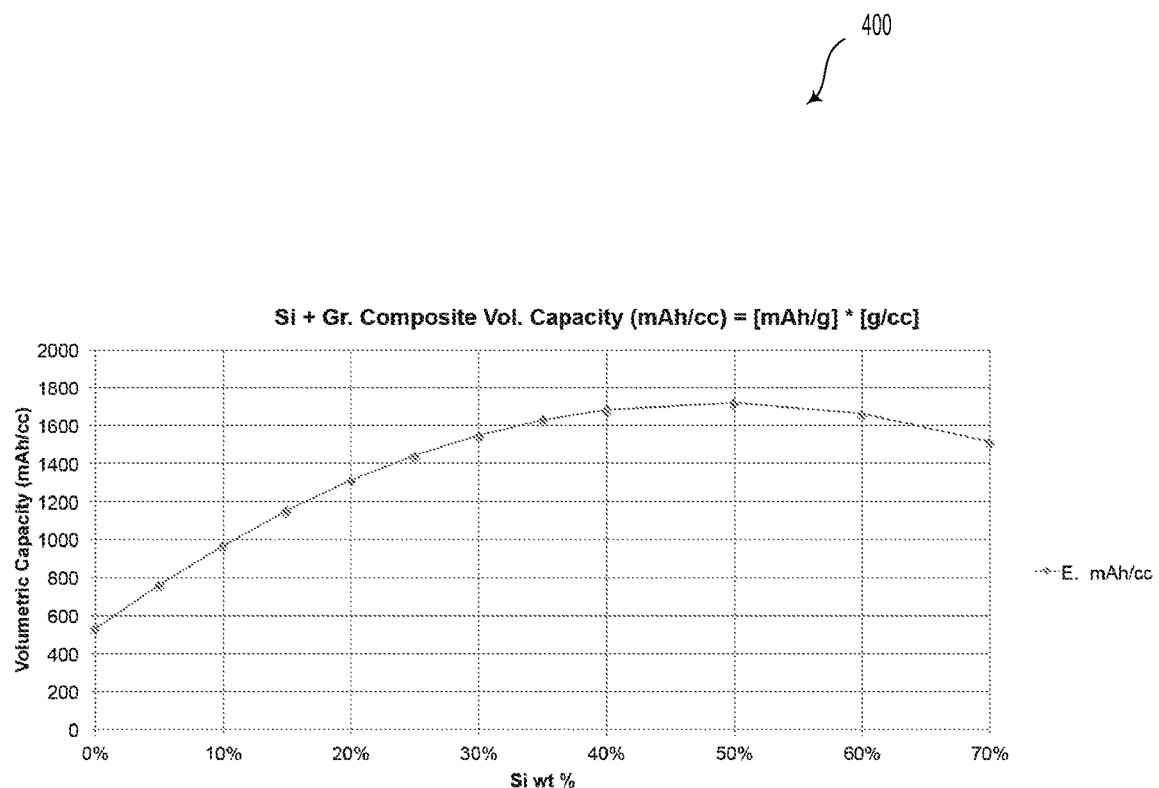
FIG. 4 illustrates volumetric capacity data versus weight percentage of silicon in a battery anode, according to an example embodiment.

FIG. 4 illustrates data 400 of volumetric capacity versus weight percentage of silicon in a battery anode, according to an example embodiment. As described elsewhere herein, the anode may include silicon at a weight percentage from 40% to 60%. In an example embodiment, a desired silicon weight percentage in the anode may be selected based on a volumetric capacity model or volumetric capacity data, such as data 400. Data 400 may be provided based on a specific capacity (mAh/g) or gravimetric energy density (Wh/kg) of Si:C anodes having varying silicon weight percentages. Data 400 may be interpolated or extrapolated from experimental measurements. Such data 400 may be used to determine a desired silicon weight percentage of an anode material (e.g., anode material 103) so as to maximize or otherwise control a gravimetric energy density of the battery. Other ways of determining a desired silicon weight percentage, or other desired battery material parameters, are possible and contemplated in the present disclosure.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A battery comprising:
a container;
an electrolyte disposed in the container;
a structure disposed in the container, wherein the structure has a rolled shape with a spiral cross-section;
a cathode comprising a cathode material disposed on a first substrate of the structure, wherein the cathode comprises the cathode material coupled to a cathode current collector;
an anode comprising an anode material disposed on a second substrate of the structure, wherein the anode comprises the anode material coupled to an anode current collector, wherein a weight percentage of silicon in the anode material is selected between 40% and 60% such that the battery provides a gravimetric energy density between 280 watt hours per kilogram and 300 watt hours per kilogram; and
lithium metal particles disposed on the anode.

2. The battery of claim 1, wherein the anode material comprises at least one of: silicon carbide, silicon monoxide, silicon dioxide, or a silicon carbon alloy.

3. The battery of claim 1, wherein the silicon weight percentage is predetermined based on a volumetric capacity model or volumetric capacity data.

4. The battery of claim 1, wherein the cathode material comprises at least one of: Lithium Manganese Oxide ($LiMn_2O_4$), Nickel-rich Lithium Nickel Cobalt Manganese Oxide ($Li_wNi_xCo_yMn_zO_2$, where w=1, x=0.5-0.6, y=0.3-0.2, z=0.2-0.1), Lithium-rich Lithium Nickel Cobalt Manganese Oxide ($Li_wNi_xCo_yMn_zO_2$, where w>1.1, x=0.1-0.2, y=0.05-0.15, z=0.5-0.6), or Lithium Nickel Manganese Oxide ($LiNi_{0.5}Mn_{1.5}O_4$).

5. The battery of claim 1, further comprising a cathode electrode tab coupled to the cathode and an anode electrode tab coupled to the anode.

6. The battery of claim 1, wherein the container is cylindrical.

7. The battery of claim 1, wherein the battery is configured to operate with a cell voltage between 3.5 V and 4.5 volts.

8. The battery of claim 1, further comprising a separator disposed between the anode and the cathode, wherein the separator comprises a polymeric material or a ceramic material.

9. The battery of claim 1, wherein the container comprises a ceramic enclosure.

10. The battery of claim 1, wherein the cathode further comprises a ceramic material.

* * * * *